(12) United States Patent
Yu et al.

(10) Patent No.: US 10,177,617 B2
(45) Date of Patent: Jan. 8, 2019

(54) EXTERNAL ROTOR MOTOR

(71) Applicant: INDUSTRIAL TECHNOLOGY RESEARCH INSTITUTE, Hsinchu (TW)

(72) Inventors: Shou-Long Yu, Taoyuan (TW); Yang-Guang Liu, Hsinchu County (TW); Yu-Choung Chang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 169 days.

(21) Appl. No.: 15/473,436

(22) Filed: Mar. 29, 2017

(65) Prior Publication Data

US 2018/0159393 A1 Jun. 7, 2018

(30) Foreign Application Priority Data

Dec. 2, 2016 (TW) .............................. 105140009 A

(51) Int. Cl.
*H02K 21/12* (2006.01)
*H02K 1/27* (2006.01)
*H02K 1/30* (2006.01)

(52) U.S. Cl.
CPC ............. *H02K 1/2786* (2013.01); *H02K 1/30* (2013.01); *H02K 2213/03* (2013.01)

(58) Field of Classification Search
CPC ............................... H02K 1/2786; H02K 1/30
USPC ............ 310/156.12, 156.13, 156.38, 156.46
See application file for complete search history.

(56) References Cited

U.S. PATENT DOCUMENTS

| 9,966,804 | B2 * | 5/2018 | Yu | .......................... H02K 1/146 |
| 2008/0150386 | A1 | 6/2008 | Huang et al. | |
| 2008/0157619 | A1 | 7/2008 | Wu | |
| 2009/0072648 | A1 | 3/2009 | Li | |
| 2009/0140590 | A1 | 6/2009 | Hung | |
| 2010/0156227 | A1 | 6/2010 | Hung | |
| 2011/0309705 | A1 | 12/2011 | Yang | |
| 2012/0043843 | A1 * | 2/2012 | Wu | ...................... H02K 1/2786 |
| | | | | 310/156.12 |

(Continued)

FOREIGN PATENT DOCUMENTS

| CN | 203119645 U | 8/2013 |
| CN | 205283355 U | 6/2016 |
| JP | 2008109838 A | 5/2008 |

(Continued)

OTHER PUBLICATIONS

TW Office Action dated Jun. 20, 2017 in application No. 105140009.

*Primary Examiner* — Hanh N Nguyen
(74) *Attorney, Agent, or Firm* — Maschoff Brennan

(57) ABSTRACT

An external rotor motor includes an inner stator and an external rotor. The external rotor includes a casing and a plurality of magnets. The casing has an annular inner wall. The annular inner wall faces the inner stator and surrounds the inner stator. The magnets are placed along the annular inner wall of the casing. The magnets surround the inner stator. An end of at least one of the magnets has a round edge, a curvature radius of the round edge is R, a thickness of the at least one of the plurality of magnets is T, and the following condition is satisfied: $0.85 \leq R/T \leq 1$.

9 Claims, 6 Drawing Sheets

(56) References Cited

U.S. PATENT DOCUMENTS

2014/0197708 A1\*  7/2014  Noda ................... H02K 29/03
                                                310/156.38

FOREIGN PATENT DOCUMENTS

| JP | 2012-039807 A | 2/2012 |
|----|---------------|--------|
| TW | 200828739 A   | 7/2008 |
| TW | 200926559 A   | 6/2009 |
| TW | I343689 B     | 6/2011 |
| TW | I408868 B     | 9/2013 |
| TW | M461248 U     | 9/2013 |
| TW | I434489 B     | 4/2014 |
| TW | I441417 B     | 6/2014 |
| TW | I477034 B     | 3/2015 |
| TW | 201622305 A   | 6/2016 |

\* cited by examiner

EXTERNAL ROTOR MOTOR

CROSS-REFERENCE TO RELATED APPLICATIONS

This non-provisional application claims priority under 35 U.S.C. § 119(a) on Patent Application No(s). 105140009 filed in Taiwan, R.O.C. on Dec. 2nd, 2016, the entire contents of which are hereby incorporated by reference.

TECHNICAL FIELD

The disclosure relates to a motor.

BACKGROUND

A conventional permanent magnet motor is simple in structure, stable in operation, small in size, low in consumption and high in efficiency, and its shape and size are easy to be changed, so the conventional permanent magnet motor is widely used in many fields, such as aerospace, national defense, industry, agriculture, manufacturing and many staffs around us. Normally, a permanent-magnet brushless external rotor motor in a ceiling fan can be operated at a low speed of 50 to 300 rpm, and provide high torque. However, low-speed and high torque motor requires large electric current, so its copper loss is largely higher than iron loss. Therefore, it is important to improve the motor efficiency by reducing electric current, and the electric current can be reduced by increasing magnetic flux.

The magnetic flux can be increased by reducing a gap between each permanent magnet. In such a case, the utilization of flux is improved with the increase of the coverage area of the permanent magnets.

SUMMARY

One embodiment of the disclosure provides an external rotor motor including an inner stator and an external rotor. The external rotor includes a casing and a plurality of magnets. The casing has an annular inner wall. The annular inner wall faces the inner stator and surrounds the inner stator. The magnets are placed along the annular inner wall of the casing. The magnets surround the inner stator. An end of at least one of the magnets has a round edge, a curvature radius of the round edge is R, a thickness of the at least one of the plurality of magnets is T, and the following condition is satisfied:

$$0.85 \leq R/T \leq 1.$$

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
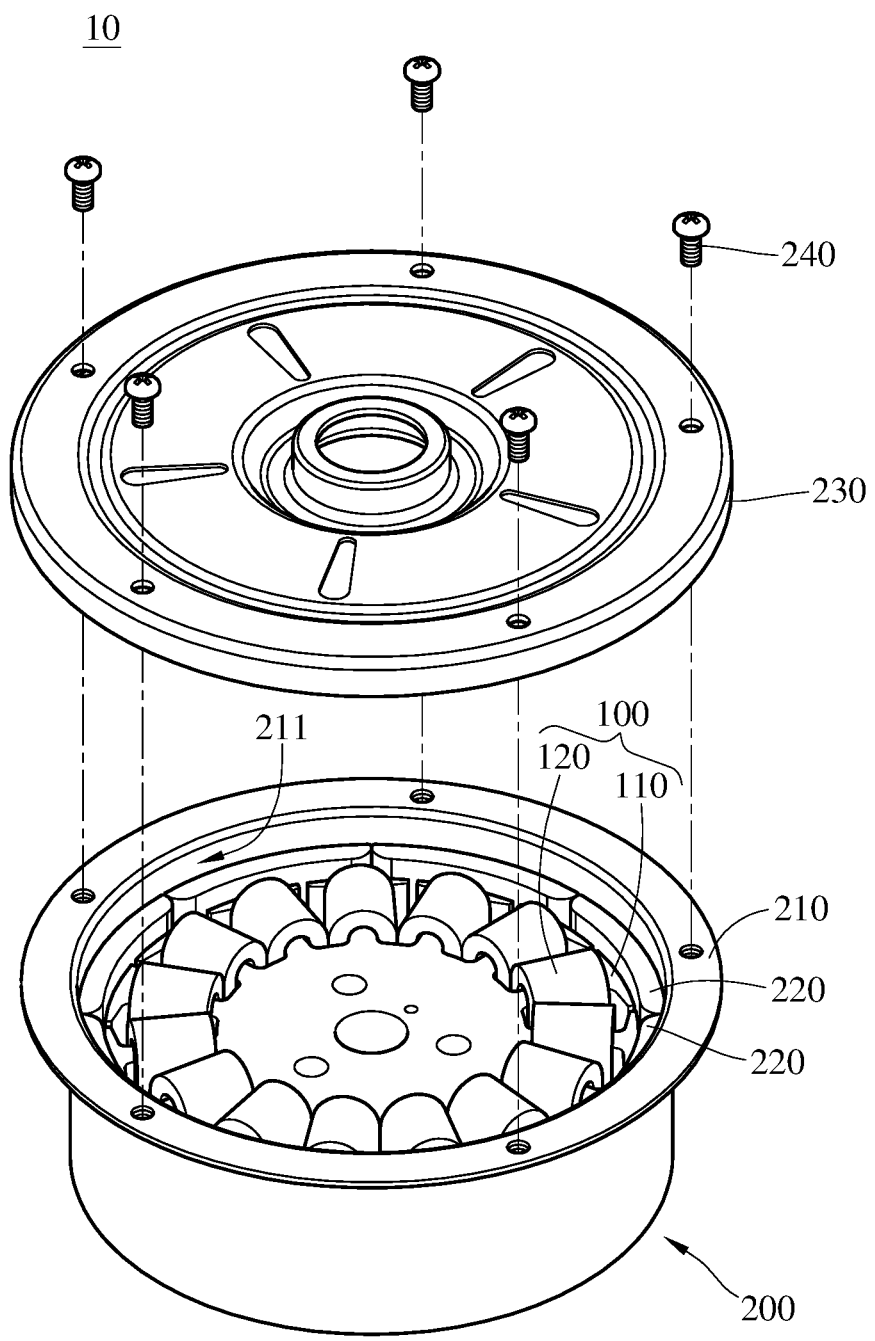
FIG. 1 is an explode view an external rotor motor according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
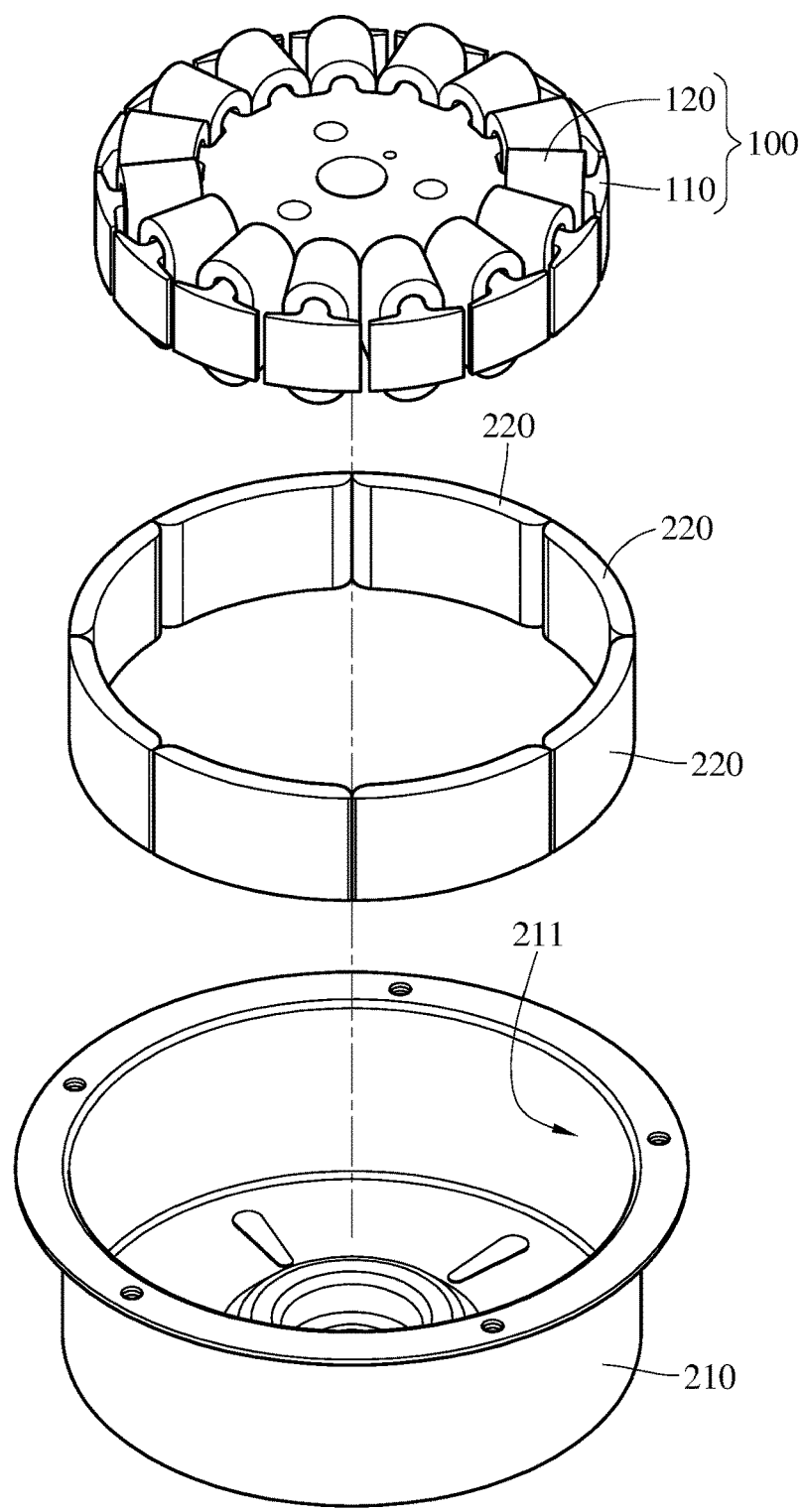
FIG. 2 is a partial exploded view of the external rotor motor in FIG. 1.
Figure 3:
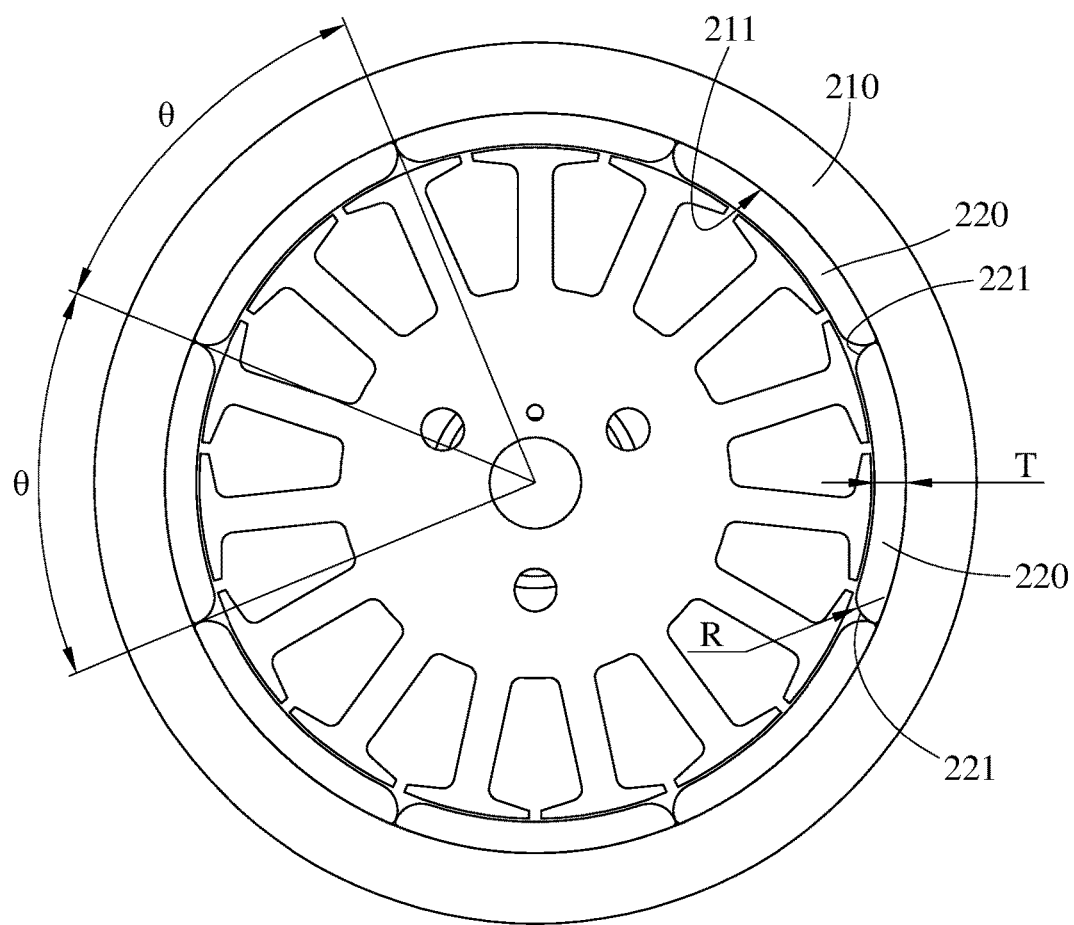
FIG. 3 is a top view of the external rotor motor in FIG. 1.

Please refer to FIG. 1 to FIG. 3. FIG. 1 is an explode view an external rotor motor according to one embodiment of the disclosure, FIG. 2 is a partial exploded view of the external rotor motor in FIG. 1, and FIG. 3 is a top view of the external rotor motor in FIG. 1. For the purpose of illustration, a cover is removed in FIG. 3.

In this embodiment, an external rotor motor 10 is provided. The external rotor motor 10 includes an inner stator 100 and an external rotor 200.

The inner stator 100 includes a stator yoke 110 and a plurality of stator windings 120. The stator windings 120 are wound round teeth portions (not numbered) of the stator yoke 110.

The external rotor 200 includes a casing 210 and a plurality of magnets 220. The casing 210 has an annular inner wall 211. The annular inner wall 211 faces the inner stator 100 and surrounds the inner stator 100. The magnets 220 are placed along the annular inner wall 211 of the casing 210, and surround the inner stator 100.

In this embodiment, the external rotor 200 further includes a cover 230 and a plurality of fasteners 240. The cover 230 is fixed to the casing 210 via the fasteners 240. The fastener 240 is, for example, a bolt, a nut or a rivet, but the present disclosure is not limited thereto. In some embodiments, the external rotor has no fastener 240, and the cover is fixed to the casing by a thermocompression process.

In this embodiment, an end of each magnet 220 has a round edge 221. A curvature radius of the round edge 221 is R, a thickness of the magnet 220 is T, and the following condition is satisfied: $0.85 \leq R/T \leq 1$. Therefore, it is favorable for conveniently assembling the magnets 220 and increasing the amount of magnetic flux passing through the magnets 220. For example, the amount of utilizable magnetic flux passing through the magnets 220 is decreased with the increase of the value of R (i.e. the curvature radius of the round edge 221). If the value of R is decreased, the magnet 220 will be interfered by the adjacent magnets 220 while being attached to the annular inner wall 211, which is inconvenient to assemble the magnets 220 to the external rotor 200.

Figure 4:
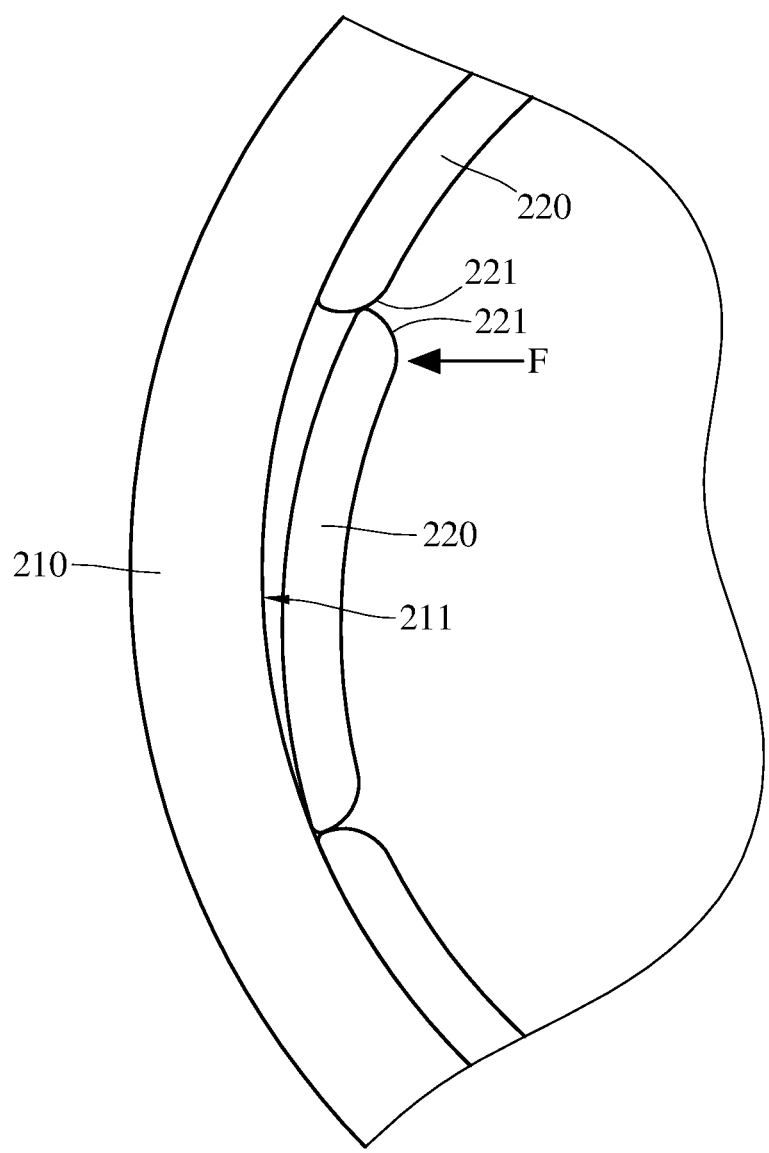
FIG. 4 is an enlarged view showing the assembly of one of magnets and a casing in FIG. 2.

Please refer to FIG. 4, which is an enlarged view showing the assembly of one of magnets and a casing in FIG. 2. Firstly, a magnet 220 is attached to the annular inner wall 211 to become a location reference for the other magnets 220. Then, the rest of the magnets 220 are placed in place by being abutted against the previously attached magnet 220. As a result, all the magnets 220 can be aligned with one another in an efficient manner. Finally, as shown in FIG. 4, the last magnet 220 is pushed toward the annular inner wall 211 by being applied a force F thereon, and the last magnet 220 is guided by the round edge 221 of the adjacent magnet 220 while being pushed toward the annular inner wall 211. That is, the round edges 221 are favorable for reducing the interference between the adjacent magnets 220.

In this embodiment, two ends of each magnet 220, that are opposite to each other, both has the round edge 221, but the present disclosure is not limited thereto. In some embodiments, only one of the magnets 220 has an end with the round edge 211, or only one of the magnets 220 has two opposite ends each having the round edge 221.

In addition, in this embodiment, the round edges 221 have the same curvature radius, but the present disclosure is not limited thereto. In some embodiments, the round edges have different curvature radius.

In this embodiment, each magnet 220 has a pair of magnetic poles opposite to each other, and eight magnets 220 have eight pairs of magnetic poles in total; that is, eight magnets 220 have sixteen magnetic poles in total. In comparison, the number of the magnets 220, that each has a pair of magnetic poles, is half of the number of the magnets of the conventional external rotor motor, that each has only one magnetic pole. Therefore, the magnets 220 are favorable for reducing the time spent on attaching the magnets 220 to the annular inner wall 211.

Figure 5:
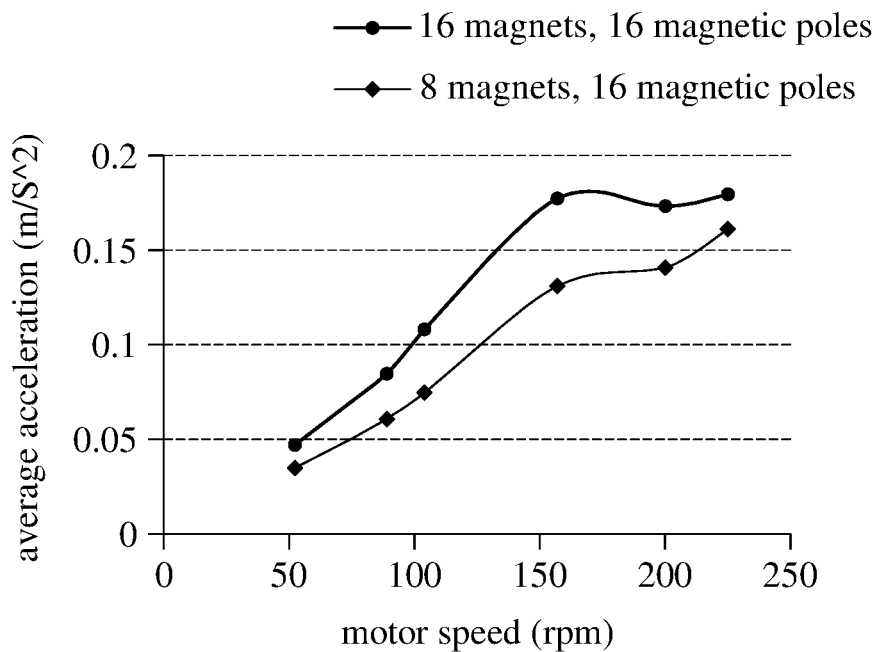
FIG. 5 is a comparison chart showing motor speed and average acceleration between the external rotor motor in FIG. 1 and a motor which has sixteen magnets having sixteen magnetic poles.

In addition, the magnets 220 are also favorable for reducing the vibration and the motor noise. Please refer to FIG. 5, which is a comparison chart showing motor speed and average acceleration between the external rotor motor in FIG. 1 and a motor which has sixteen magnets having sixteen magnetic poles. When these two motors are at the same motor speed, the average acceleration of the external rotor motor 10, which has eight magnets having sixteen magnetic poles in total, is lower than the average acceleration of the motor, which has sixteen magnets having sixteen magnetic poles. That is, the external rotor motor 10, which has eight magnets having sixteen magnetic poles in total, has less vibration and motor noise.

In this embodiment: each magnet 220 has a spread angle $\theta$; the spread angle $\theta$ is a central angle which is formed between two extending lines, that are respectively parallel to two opposite sides of the magnet 220, intersecting at a center of the inner stator 100; the number of the magnets 220 is A; a magnet-spread angle ratio is $\theta/(360/A)$; and the following condition is satisfied: $\theta/(360/A)=1$.

When the said condition of "$\theta/(360/A)=1$" is satisfied, the adjacent magnets 220 are in contact with each other; that is, there is no gap between each magnet 220. For example, the number of the magnets in this embodiment is eight, and the spread angle $\theta$ is 45 degrees, but the present disclosure is not limited thereto. In some embodiments, the following condition may be satisfied: $0.8<\theta/(360/A)<1$.

Figure 6:
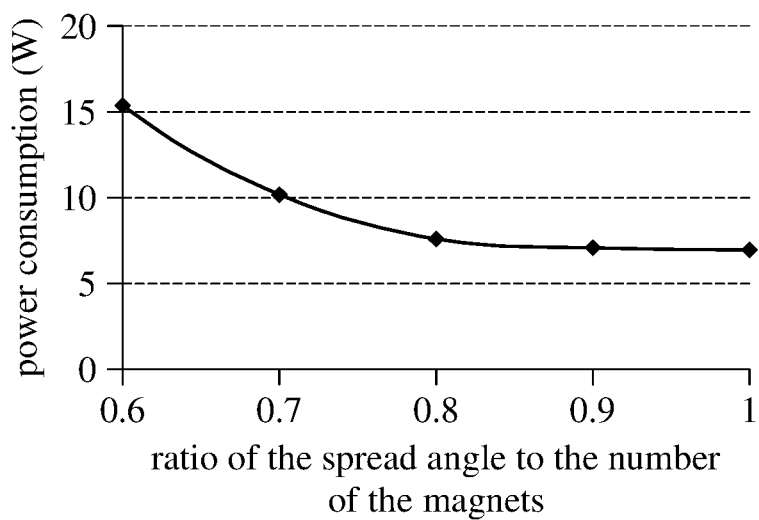
FIG. 6 is a chart showing magnet-spread angle ratio and power consumed by stator windings of the external rotor motor in FIG. 1.
Figure 7:
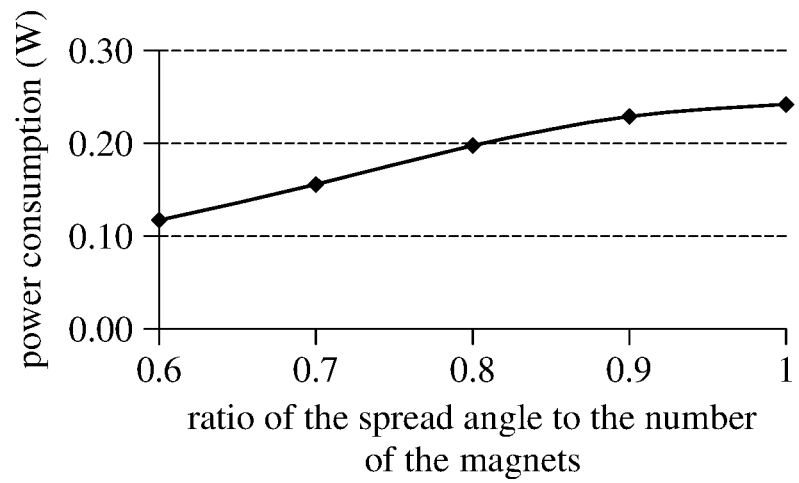
FIG. 7 is a chart showing the magnet-spread angle ratio and power consumed by the magnets of the external rotor motor in FIG. 1.
Figure 8:
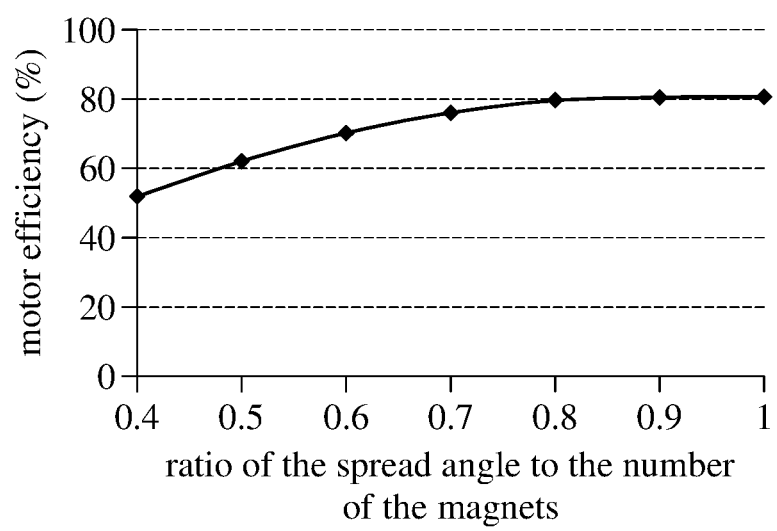
FIG. 8 is a chart showing the magnet-spread angle ratio and motor efficiency of the external rotor motor in FIG. 1.

Please refer to FIG. 6 to FIG. 8. FIG. 6 is a chart showing magnet-spread angle ratio and power consumed by stator windings of the external rotor motor in FIG. 1, FIG. 7 is a chart showing the magnet-spread angle ratio and power consumed by the magnets of the external rotor motor in FIG. 1, and FIG. 8 is a chart showing the magnet-spread angle ratio and motor efficiency of the external rotor motor in FIG. 1.

When the said condition of "$0.8 \leq \theta/(360/A)<1$" is satisfied, the consumed power (W) of the stator windings 120 is decreased from about 16 to 7 (as shown in FIG. 6), and the consumed power (W) of the magnets 220 is increased from about 0.12 to 0.25 (as shown in FIG. 7). The power consumed by the magnets 220 is slightly increased, but it is very less than the amount of increase in the power consumed by the stator windings 120. In overall, the motor efficiency of the external rotor motor 10 is increased from about 52% to 80%. In other words, the power consumed by the magnets 220 is slightly increased, but the power consumed by the stator windings 120 is largely decreased. Therefore, it is favorable for largely improving the motor efficiency of the external rotor motor.

According to the external rotor motor as discussed above, the following condition is satisfied: $0.85 \leq R/T \leq 1$, wherein R is the curvature radius of the round edge, and T is the thickness of the magnet. Therefore, it is favorable for efficiently assembling the magnets and increasing the amount of utilizable magnetic flux passing through the magnets, thereby improving the motor efficiency.

In addition, each magnet has a pair of magnetic poles. Therefore, it is favorable for reducing the time spent on assembling the magnets, and also favorable for reducing the vibration and the motor noise.

Furthermore, the following condition is satisfied: $0.8 \leq \theta/(360/A) \leq 1$, wherein $\theta/(360/A)$ is the magnet-spread angle ratio, $\theta$ is the spread angle of the magnet, and A is the number of the magnets. The power consumed by the magnets is slightly increased, but the power consumed by the stator windings is largely reduced. Therefore, it is favorable for largely improving the motor efficiency.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An external rotor motor, comprising:
an inner stator; and
an external rotor, comprising a casing and a plurality of magnets, the casing having an annular inner wall, the annular inner wall facing the inner stator and surrounding the inner stator, the plurality of magnets being placed along the annular inner wall of the casing, and the plurality of magnets surrounding the inner stator;
wherein, an end of at least one of the plurality of magnets has a round edge, a curvature radius of the round edge is R, a thickness of the at least one of the plurality of magnets is T, and the following condition is satisfied:

$0.85 \leq R/T \leq 1$.

2. The external rotor motor according to claim 1, wherein at least one of the plurality of magnets has two ends opposite to each other, each of the two ends has a round edge, a curvature radius of each of the two round edges is R, a thickness of the at least one of the plurality of magnets is T, and the following condition is satisfied:

$0.85 \leq R/T \leq 1$.

3. The external rotor motor according to claim 2, wherein each of the plurality of magnets has two ends opposite to each other, each of the two ends has a round edge, a curvature radius of each of the round edges is R, a thickness of each of the plurality of magnets is T, and the following condition is satisfied:

$0.85 \leq R/T \leq 1$.

4. The external rotor motor according to claim 1, wherein the number of the plurality of magnets is A, each of the plurality of magnets has a spread angle θ, and the following condition is satisfied:

$$0.8 \leq \theta/(360/A) \leq 1.$$

5. The external rotor motor according to claim 4, wherein the number of the plurality of magnets is A, the spread angle of each of the plurality of magnets is θ, and the following condition is satisfied:

$$\theta/(360/A)=1.$$

6. The external rotor motor according to claim 1, wherein the external rotor further comprises a cover and a plurality of fasteners, and the plurality of fasteners are configured to fix the cover to the casing.

7. The external rotor motor according to claim 1, wherein the external rotor further comprises a cover, and the cover and the casing are fixed together by a thermocompression process.

8. The external rotor motor according to claim 1, wherein each of the plurality of magnets has a pair of magnetic poles.

9. The external rotor motor according to claim 1, wherein the number of the plurality of magnets is eight, and the eight magnets have eight pairs of magnetic poles in total.

* * * * *